US012806831B2

(12) United States Patent
Zhang et al.

(10) Patent No.: US 12,806,831 B2
(45) Date of Patent: Nov. 24, 2026

(54) PACKING STRUCTURE AND PREPARATION DEVICE THEREOF, ENCAPSULATION MOLD AND VEHICLE WINDOW ASSEMBLY

(71) Applicant: SAINT-GOBAIN GLASS FRANCE, Courbevoie (FR)

(72) Inventors: Hailong Zhang, Shanghai (CN); Daniel Durmek, Bratislava (SK)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 78 days.

(21) Appl. No.: 18/554,565

(22) PCT Filed: Jun. 1, 2022

(86) PCT No.: PCT/CN2022/096520

§ 371 (c)(1),
(2) Date: Oct. 9, 2023

(87) PCT Pub. No.: WO2022/253253

PCT Pub. Date: Dec. 8, 2022

(65) Prior Publication Data

US 2024/0198565 A1 Jun. 20, 2024

(30) Foreign Application Priority Data

Jun. 3, 2021 (CN) ......................... 202110617085.8

(51) Int. Cl.
*B29C 45/14* (2006.01)
*B60J 10/70* (2016.01)
*B29L 31/30* (2006.01)

(52) U.S. Cl.
CPC ......... *B29C 45/14434* (2013.01); *B60J 10/70* (2016.02); *B29C 2045/14459* (2013.01); *B29L 2031/30* (2013.01)

(58) Field of Classification Search
None
See application file for complete search history.

(56) References Cited

U.S. PATENT DOCUMENTS 5,800,757 A * 9/1998 Abrams ................ B20C 48/793 264/132
2013/0106140 A1* 5/2013 Ishikawa .................. B60J 10/20 296/192
2019/0077230 A1 3/2019 Tallent et al.

FOREIGN PATENT DOCUMENTS

AU 2006100386 A4 6/2006
CN 104648093 A 5/2015
(Continued)

OTHER PUBLICATIONS

Jiangyin CN211251097U 2019 English Translation (Year: 2019).*
(Continued)

*Primary Examiner* — Jacob T Minskey
*Assistant Examiner* — Adrien J Bernard
(74) *Attorney, Agent, or Firm* — CUSHMAN PARTNERS LLC

(57) ABSTRACT

A packaging structure includes a main body adapted to be installed in an encapsulation mold and provided with an attachment surface to attach to at least part of a surface of a glass to be encapsulated, and a lip extending from the attachment surface of the main body to be suitable for sealing the surface of the glass, wherein at least a part of the packaging structure is made of flexible material.

13 Claims, 4 Drawing Sheets

(56) References Cited

FOREIGN PATENT DOCUMENTS

| | | | |
|---|---|---|---|
| CN | 106142436 | A | 11/2016 |
| CN | 206812771 | U | 12/2017 |
| CN | 209566772 | U | 11/2019 |
| CN | 211251097 | U | 8/2020 |
| CN | 111823837 | A | 10/2020 |
| CN | 112810062 | A | 5/2021 |
| WO | WO2020/118673 | A1 | 6/2020 |

OTHER PUBLICATIONS

International Search Report as issued in International Patent Application No. PCT/CN2022/096520, dated Sep. 9, 2022.

First Office Action as issued in Chinese Patent Application No. 202110617085.8, dated Aug. 1, 2026.

* cited by examiner

PACKING STRUCTURE AND PREPARATION DEVICE THEREOF, ENCAPSULATION MOLD AND VEHICLE WINDOW ASSEMBLY

CROSS-REFERENCE TO RELATED APPLICATIONS

This application is the U.S. National Stage of PCT/CN2022/096520, filed Jun. 1, 2022, which in turn claims priority to Chinese patent application number 202110617085.8 filed Jun. 3, 2021. The content of these applications are incorporated herein by reference in their entireties.

FIELD OF THE INVENTION

The present disclosure relates to the field of automobile parts. More particularly, it relates to a packaging structure for injection molding of vehicle glass and a preparation device thereof, and also relates to an encapsulation mold for applying the packaging structure to encapsulate the edge of the vehicle glass and a vehicle window assembly manufactured thereby.

BACKGROUND OF THE INVENTION

With the rapid development of the automobile industry, the shape of the vehicle is more beautiful and fashionable, and more and more vehicle manufacturers choose to inject encapsulation on the edge of the vehicle glass such as quarter window. For the conventional encapsulation mold, in the production process, the glass is placed in the molding cavity, and the pressure applied in the molding cavity can reach 150 bar or even higher after the mold is closed. For glasses with different thicknesses, if the glass is too thick, the space in the molding cavity is too small after closing the mold, which will easily lead to glass breakage under pressure. However, if the glass is thin, there is a gap between the glass and the molding cavity. Under the injection pressure of the injection material, the injection material may enter the gap to cause overflow and flash and result in appearance defects. Even if the overflow structure can be removed manually, it will inevitably increase the workload, prolong the production cycle and increase unnecessary extra costs.

The existing solution uses floating mechanism to adjust the position of the glass in the molding cavity, so as to solve the problem that the glass is easy to break or the generation of overflow during mold closing and injection molding. However, as shown in FIG. 1, the glass is still in direct contact with the wall in the encapsulation mold which is made by hard material. Specifically, after the glass 3 is placed in the molding cavity 4 formed by the upper mold 1 and the lower mold 2 in the injection mold, the glass 3 is in direct contact with a floating block 5 of the floating mechanism, which is usually made of hard material. In this way, once the glass 3 and the floating block 5 are not well attached with each other at the position A in the figure, there may be a gap resulting in overflow and flash and even glass breakage.

SUMMARY OF THE INVENTION

The object of the present disclosure is to solve the above-mentioned problems in the prior art, and propose a packaging structure for injection molding of vehicle glass, which can ensure good sealing between the glass and the molding cavity of the mold, improve the appearance defects of the vehicle glass and avoid glass breakage.

To this end, according to one aspect of the present disclosure, a packaging structure is provided, which comprises: a main body adapted to be installed in an encapsulation mold and provided with an attachment surface to attach to at least part of the surface of a glass to be encapsulated; and a lip extending from the attachment surface of the main body to be suitable for sealing the surface of the glass; wherein at least a part of the packaging structure is made of flexible material.

By providing the packaging structure, and at least a part of the packaging structure is made of flexible material, in the process of injecting encapsulation to the edge of the glass, the glass is prevented from contacting with hard material in the molding cavity or the mold, the glass breakage rate and the problem of excess flash on the outer surface of the glass are reduced, the mold damage and the maintenance cost thereof caused by the glass breakage are reduced, and the labor for cleaning the flash is reduced, so that the cost is saved.

According to the above technical concept, the present disclosure may further include any one or more of the following optional forms.

In some optional forms, the main body is provided with a mounting hole to be suitable for being fixed in the encapsulation mold by a fastener.

In some optional forms, the packaging structure further comprises a supporting edge extending from the attachment surface in the opposite direction to the lip, and the thickness of the supporting edge is greater than or equal to the thickness of the lip.

In some optional forms, the packaging structure is configured as a strip or a frame followed by the shape of the glass.

In some optional forms, the packaging structure is made of thermoplastic elastomer.

According to another aspect of the present disclosure, a preparation device for the above-mentioned packaging structure is provided, which comprises a molding chamber to be suitable for manufacturing the packaging structure by flexible material.

In some optional forms, the preparation device is a rapid mold.

According to another aspect of the present disclosure, an encapsulation mold is provided, which comprises an upper mold and a lower mold, the upper mold and the lower mold defining a molding cavity; and at least one of the above-mentioned packaging structure; wherein the packaging structure is arranged in the upper mold and/or the lower mold, and the packaging structure is arranged outside the molding cavity adjacent to the molding cavity with the lip of the packaging structure not exceeding a cavity wall of the molding cavity.

In some optional forms, the encapsulation mold is provided with a groove to accommodate the packaging structure, and the groove is provided with an engagement hole to be suitable for fixing the packaging structure in the encapsulation mold by a fastener.

In some optional forms, the encapsulation mold further comprises a floating mechanism to support the glass to be encapsulated. By combining the packaging structure with the floating mechanism, the error caused by manual positioning of the glass can be avoided, the positioning accuracy can be improved, and the labor cost can be reduced. In addition, the height and other positions can be adjusted according to the shapes and/or thicknesses of different glasses, and thus the production efficiency can be improved.

According to another aspect of the present disclosure, a vehicle window assembly is provided, which comprises a glass and an encapsulation covering at least one edge area of the glass, and the vehicle window assembly is manufactured by the above-mentioned encapsulation mold.

In some optional forms, the glass is a sunroof glass, a vehicle door glass or a quarter window glass.

The packaging structure of the present disclosure can ensure better sealing between the glass and the molding cavity, prevent overflow and flash, reduce the appearance defects of injection molding, and improve the product qualification rate. At the same time, due to the soft contact between the glass and the molding cavity, in the process of mold closing and injection molding, the glass can be effectively prevented from breaking, the cost is reduced, the production efficiency is high and easy to control, and it is widely applicable to various occasions.

BRIEF DESCRIPTION OF THE DRAWINGS

Other features and advantages of the present disclosure will be better understood by the following alternative embodiments described in detail in conjunction with the accompanying drawings, in which the same reference numerals identify the same or similar components, and in different embodiments, the same or similar components are labeled with the same one or two digits, in the drawings.

DETAILED DESCRIPTION OF EMBODIMENTS

Figure 1:
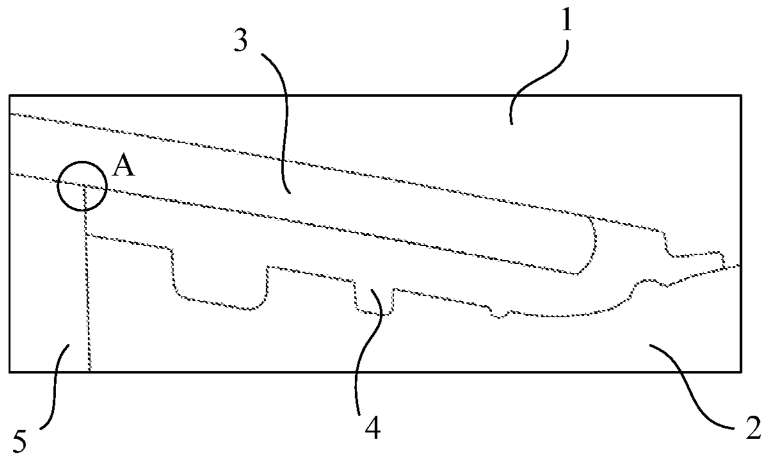
FIG. 1 is a schematic cross-sectional view of a molding device of a conventional vehicle window assembly.

The implementation and use of the embodiments are discussed in detail below. However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

According to the concept of the present disclosure, a packaging structure used in the injection molding process of a vehicle window assembly is provided. When the packaging structure is applied to an encapsulation mold for encapsulating the edge of the glass, it can play the role of a soft pad to provide flexible protection between the glass and the molding cavity, and ensure effective sealing at the same time, so as to obtain good product quality and appearance quality.

It should be understood that the encapsulation can also be called "sealing material", which refers to the material injected into the mold in the molten state during the injection process of the vehicle window assembly. The encapsulation, usually thermoplastic polymer, plays a sealing role and can reduce wind noise and ensure a good appearance. Depending on different production requirements, the shape of the glass of the vehicle window assembly can be triangular, quadrilateral or polygonal. Correspondingly, the encapsulation can cover one, two or more edge areas of the glass. It should be understood that although a quarter window glass shaped as triangle is taken as an example in the drawings and the description, the glass of the vehicle window assembly in this text includes but not limited to front door glass, rear door glass or sunroof glass, etc.

Figure 2:
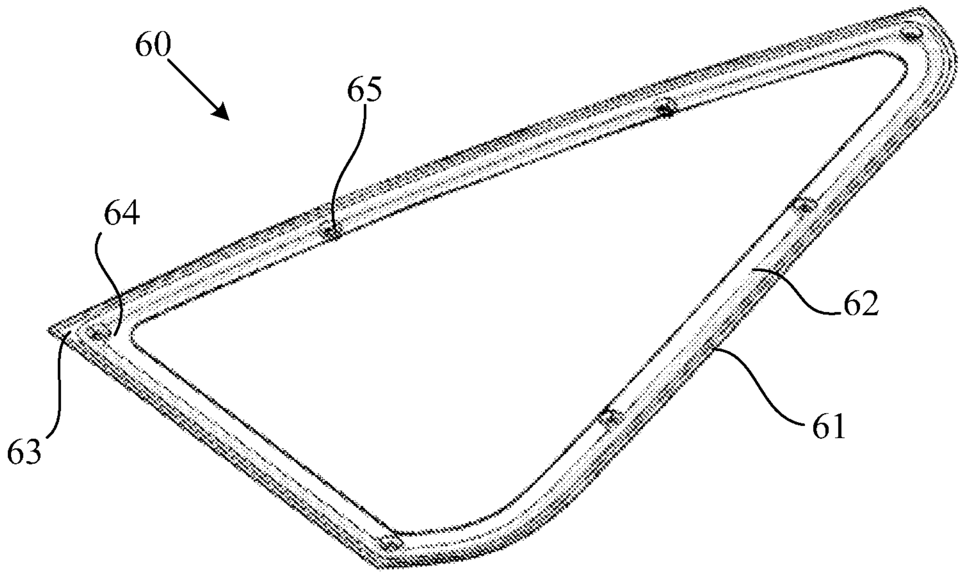
FIG. 2 is a schematic view of a packaging structure according to an embodiment of the present disclosure.
Figure 6:
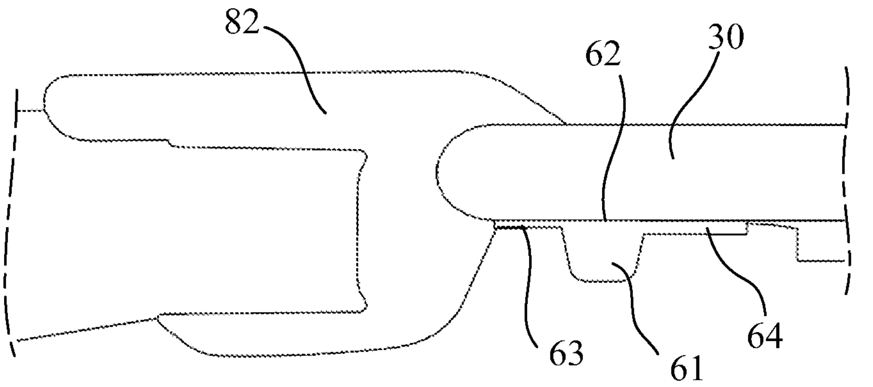
FIG. 6 is a schematic cross-sectional view of the encapsulation mold in FIG. 5 when used in the encapsulation process of the glass.

According to the present disclosure, the packaging structure comprises a main body which is suitable for being installed in an encapsulation mold, and a lip extending from the main body. FIGS. 2 and 6 illustrate an embodiment of the packaging structure 60, in which the main body 61 is configured as a triangular frame structure matched with the shape of the quarter window, so as to be suitable for providing packaging and protection during the injection molding process of the quarter window assembly. The main body 61 is provided with an attachment surface 62 to attach to at least part of the surface of the glass to be encapsulated, and the lip 63 extends from the attachment surface 62 of the main body 61 to the periphery to be suitable for sealing the surface of the glass. In the illustrated embodiment, the lip 63 is arranged at the entire peripheral periphery of the main body 61. Depending on the encapsulation design of the vehicle window assembly, in some embodiments, the lip can also be arranged on one side periphery, two sides periphery or more sides periphery of the main body, and can extend continuously or intermittently along one side periphery, two sides periphery or more sides periphery of the main body.

Advantageously, at least a part of the packaging structure is made of flexible material. Preferably, at least the lip 63 is made of flexible material. It should be understood that, compared with the hardness of each component in the molding cavity of the encapsulation mold, the flexible material here should have mechanical properties including appropriate hardness, sufficient flexibility, heat resistance and the other, as well as chemical properties such as not reacting or melting with the encapsulation material. The required flexibility can be obtained by adopting plastic or plastic cement materials. For example, thermoplastic elastomer (TPE) can be selected.

In some embodiments, the packaging structure 60 further includes a supporting edge. As shown in FIGS. 2 and 6, the supporting edge 64 extends from the attachment surface 62 to the inner periphery in the opposite direction to the lip 63, thus providing a larger area of support for the glass surface, and further avoiding the damage caused by the compression to the edge of the glass during mold closing and injection molding. The width and thickness of the lip and the supporting edge extending relative to the attachment surface 62 can be chosen based on the compression amount of the selected material, glass tolerance and other factors. Advantageously, the thickness of the supporting edge is greater than or equal to the thickness of the lip.

In some embodiments, the main body of the packaging structure may be provided with a mounting hole. In the embodiment shown in FIG. 2, a plurality of mounting holes 65 are arranged at intervals along the main body 61 of the packaging structure 60, so that the main body is suitable for being fixed in the encapsulation mold by fasteners, such as pins, clips, bolts, screws or nuts. It should be understood that it is also possible to adopt other suitable fixing methods, such as glue or adhesive tape. When the packaging structure is constructed to be suitable for injection molding processes of various glass configurations, it is more advantageous to install, dis-assemble and replace the packaging structure by using fasteners.

Figure 3A:
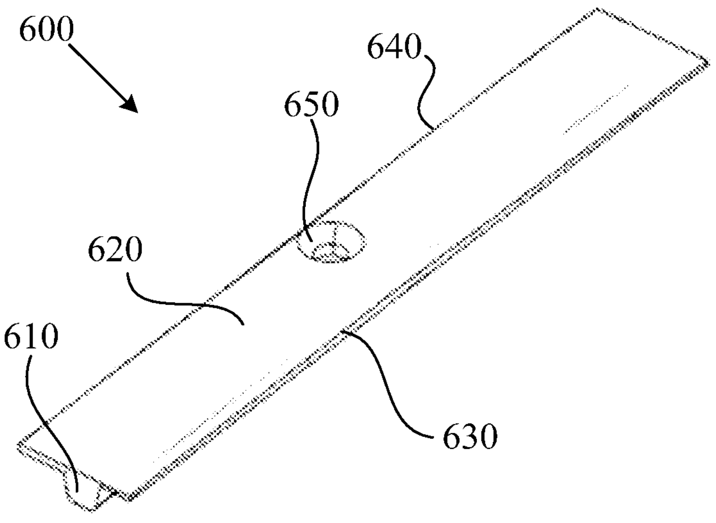
FIG. 3A is a schematic view of a packaging structure according to another embodiment of the present disclosure.
Figure 3B:
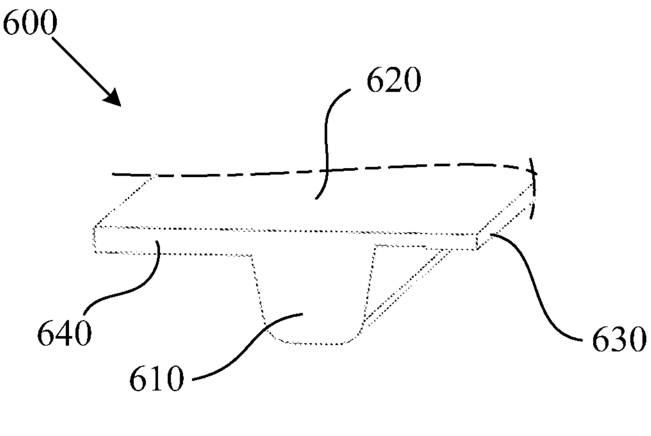
FIG. 3B illustrates a partial enlarged view of the packaging structure in FIG. 3A.

In some embodiments, the packaging structure can be configured as a strip, such as a packaging structure 600 shown in FIGS. 3A and 3B. The packaging structure 600 of this embodiment includes a strip-shaped main body 610 with an attachment surface 620, and a lip 630 and a supporting edge 640 extend from the attachment surface 620 to both sides, respectively. The supporting edge 640 is advantageously configured to have a thickness larger than that of the lip 630 to provide more effective support. Depending on the required length of the packaging structure 600, one or more mounting holes may be provided, and one mounting hole 650 is exemplarily shown in FIG. 3A. According to different glass configurations or different requirements for the encapsulation design of the edge of the glass, the packaging structure 60 shaped as triangular frame structure shown in FIG. 2 can be combined with the packaging structure 600 shaped as strip structure shown in FIG. 3A, or multiple packaging structures 600 with the same or different lengths can be used to package each edge of the glass to be encapsulated, which is more widely used.

Figure 4:
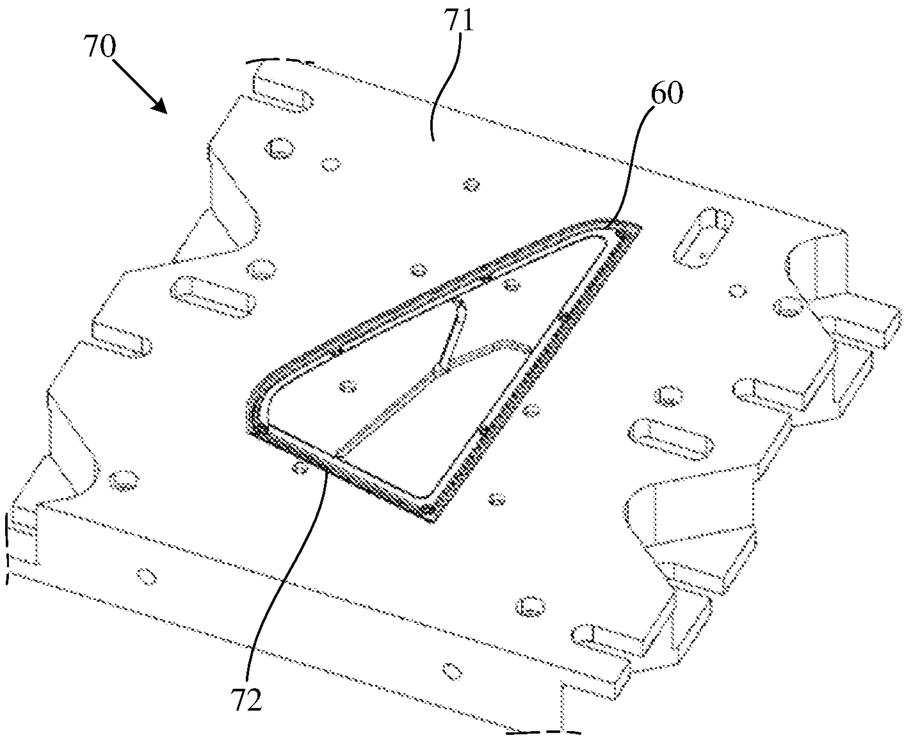
FIG. 4 is a partial schematic view of a preparation device for a packaging structure according to an embodiment of the present disclosure, and illustrates a formed packaging structure.

FIG. 4 illustrates a part of a preparation device 70 for preparing a packaging structure, such as a lower mold 71. A molding chamber is provided in the lower mold 71, or a part of the molding chamber is provided in the upper mold and the lower mold 71, and the molding chamber is formed together after the mold is closed, so that a packaging structure with a specific configuration can be conveniently manufactured by injection molding of flexible material. In FIG. 4, the packaging structure 60 shaped as triangle is taken as an example to illustrate an appropriate molding chamber 72. Alternatively, the preparation device 70 can be a rapid mold, which has short molding cycle and low cost, and its precision and life can meet specific requirements, so that it is suitable for mass production of the packaging structure. The characteristic that the packaging structure is easy to prepare also makes it possible to adjust and replace the packaging structure according to different glass configurations, encapsulation configurations, production cycles and other actual conditions in different applications, thus further ensuring the finished product yield and appearance quality of the glass assembly.

Figure 5:
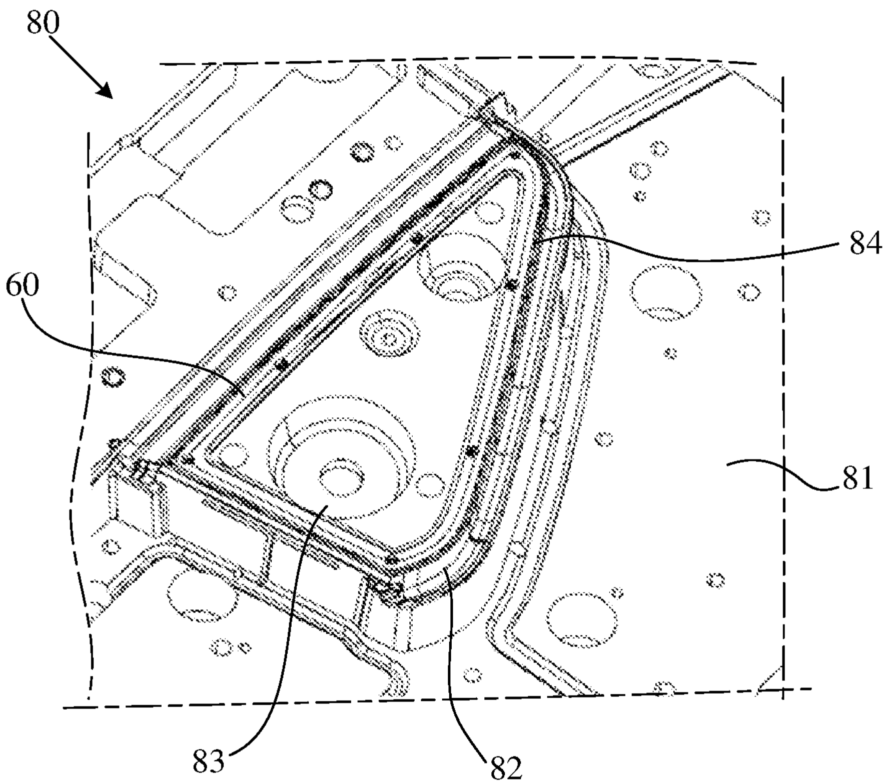
FIG. 5 is a partial schematic view of an encapsulation mold according to an embodiment of the present disclosure, and illustrates a packaging structure adapted to the molding cavity.

FIG. 5 exemplarily shows a part of an encapsulation mold 80 to which the packaging structure 60 shaped as triangle is applied, such as a lower mold 81. A molding cavity is provided in the lower mold 81, or a part of the molding cavity is provided in each of the upper mold and the lower mold 81, and the molding cavity is formed together after the mold is closed. The packaging structure 60 is arranged in the upper mold and/or the lower mold, and is arranged outside the molding cavity adjacent to the molding cavity 82, for example, within the triangular area defined by the molding cavity 82 in FIG. 5. The lip of the packaging structure does not exceed a cavity wall of the molding cavity 82, so that the lip does not interfere with the encapsulation to be molded.

FIG. 6 shows a schematic cross-sectional view of the encapsulation mold 80 with the packaging structure 60 shown in FIG. 5 which is used for the encapsulation process of the edge of the glass. In conjunction with FIG. 2, when the glass 30 is placed in the molding cavity of the encapsulation mold, it is attached to the attachment surface 62 of the packaging structure 60 and supported by the supporting edge 64. The lip 63 extends toward the molding cavity 82 but does not exceed the cavity wall of the molding cavity 82. In this way, when the mold is closed and pressurized with injecting the encapsulation material, the lip 63 seals the lower side of the edge of the glass 30, and the encapsulation material only fills the molding cavity 82 up to the lip 63 without penetrating into the lower surface of the glass, thus ensuring the good appearance of the molded product. At the same time, at least the lip 63 made of flexible material has a certain protective effect on the glass under the pressure condition, avoiding the occurrence of glass breakage and improving the yield.

It should be understood that although the packaging structure arranged on the lower surface of the glass 30 is described as an example in the drawings, in some embodiments, the packaging structure can also be arranged on the upper surface of the glass, or the packaging structure can be arranged on both the upper and lower surfaces of the glass, so as to provide sealing and protection for glass assemblies with different encapsulation configurations.

The packaging structure of the present disclosure can be advantageously combined into the existing encapsulation mold without major structural changes to the mold. For example, as shown in FIG. 5, a groove 84 can be formed in the encapsulation mold to accommodate the packaging structure, so that the packaging structure does not protrude too much from the bearing surface of the glass to affect the placement of the glass. Depending on the arrangement of one or more packaging structures, the groove 84 may be provided along the entire periphery of the molding cavity, or only in the area to be encapsulated. In some embodiments, the groove may be provided with an engagement hole to be suitable for fixing the packaging structure in the encapsulation mold by a fastener.

In some embodiments, the encapsulation mold may further include a floating mechanism 83, as shown in FIG. 5. The floating mechanism 83 helps to adjust according to the shape change and/or thickness difference of different glasses, and prevents the glass from breaking during mold closing and injection molding. Therefore, the combination of the packaging structure and the floating mechanism can increase the output of the glass by at least 10% with respect to glass breakage, and at the same time, the overflow or flash defects will not occur, thus greatly saving the production cost and making the application of the encapsulation mold more extensive.

By adopting the packaging structure of the present disclosure, the unique structural design and material selection make the demoulded vehicle window assembly have good appearance quality and assembly quality, and improve the production yield. The design of the packaging structure is simple, the process flow is simplified, the production cost is saved, and the design diversification of the vehicle window assembly is satisfied, so it has a wide application prospect.

It should be understood here that the embodiments shown in the drawings only illustrate the optional architectures, shapes, sizes and arrangements of various optional components of the packaging structure, its preparation device and the encapsulation mold according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invention claimed is:

1. A packaging structure comprising:

a main body adapted to be installed in an encapsulation mold and provided with an attachment surface to attach to at least part of a surface of a glass to be encapsulated, and a lip extending from the attachment surface of the main body and adapted to attach to the surface of the glass to be suitable for sealing the surface of the glass, wherein at least a part of the packaging structure is made of flexible material, and wherein the packaging structure is a manufacturing tool configured to be seated in the encapsulation mold during an injection molding process for encapsulating an edge of the glass.

2. The packaging structure according to claim 1, wherein the main body is provided with a mounting hole to be suitable for being fixed in the encapsulation mold by a fastener.

3. The packaging structure according to claim 1, wherein the packaging structure further comprises a supporting edge extending from the attachment surface in the opposite direction to the lip, and a thickness of the supporting edge is greater than or equal to a thickness of the lip.

4. The packaging structure according to claim 1, wherein the packaging structure is configured as a strip or a frame followed by a shape of the glass.

5. The packaging structure according to claim 1, wherein the packaging structure is made of thermoplastic elastomer.

6. A preparation device for a packaging structure according to claim 1, wherein the preparation device comprises a molding chamber to be suitable for manufacturing the packaging structure by flexible material.

7. The preparation device according to claim 6, wherein the preparation device is a mold for injection molding.

8. An encapsulation mold comprising:

an upper mold and a lower mold, the upper mold and the lower mold defining a molding cavity for receiving a glass to be encapsulated;

at least one packaging structure according to claim 1, wherein the packaging structure is arranged in the upper mold and/or the lower mold, and the packaging structure is arranged outside the molding cavity adjacent to the molding cavity with the lip of the packaging structure not exceeding a cavity wall of the molding cavity.

9. The encapsulation mold according to claim 8, wherein a groove is formed in the encapsulation mold to accommodate the packaging structure, and the groove is provided with an engagement hole to be suitable for fixing the packaging structure in the encapsulation mold by a fastener.

10. The encapsulation mold according to claim 8, wherein the encapsulation mold further comprises a floating mechanism to support the glass to be encapsulated.

11. A vehicle window assembly comprising a glass and an encapsulation covering at least one edge area of the glass, wherein the vehicle window assembly is manufactured by an encapsulation mold according to claim 8.

12. The vehicle window assembly according to claim 11, wherein the glass is a sunroof glass, a vehicle door glass or a quarter window glass.

13. The packaging structure according to claim 1, wherein the main body is configured as a frame matched to a peripheral shape of the glass and the lip extends along an entire peripheral edge of the frame.

* * * * *